R. C. BALL.
Wash-Stand and Water-Closet Combined.
No. 167,972. Patented Sept. 21, 1875.
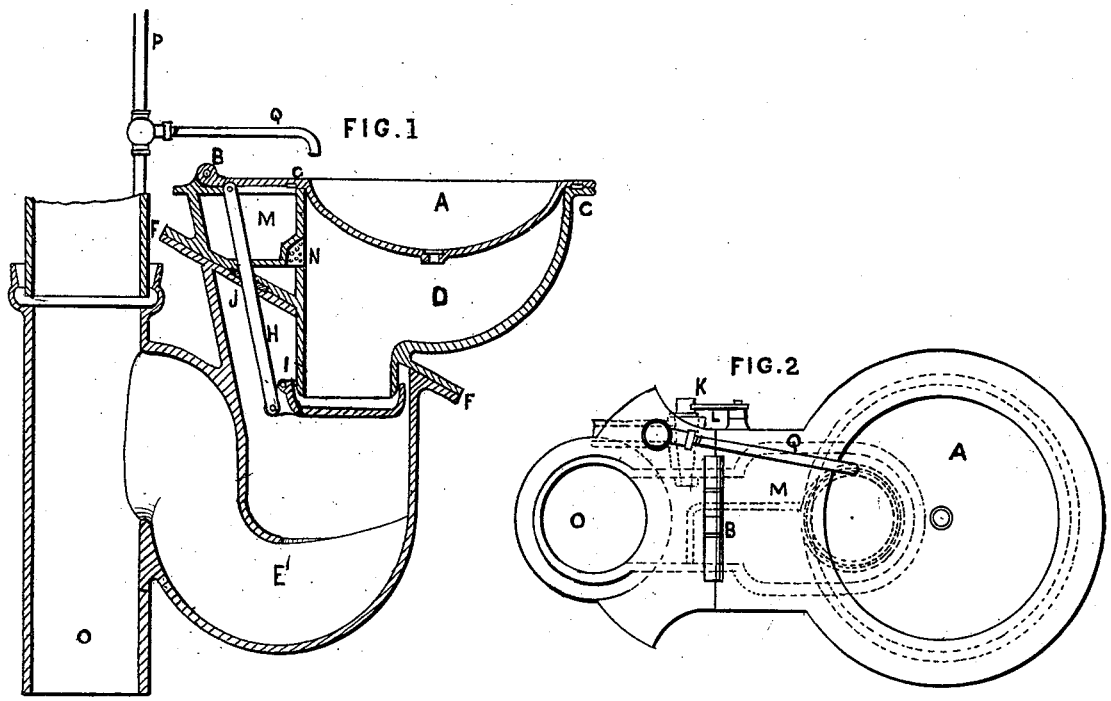
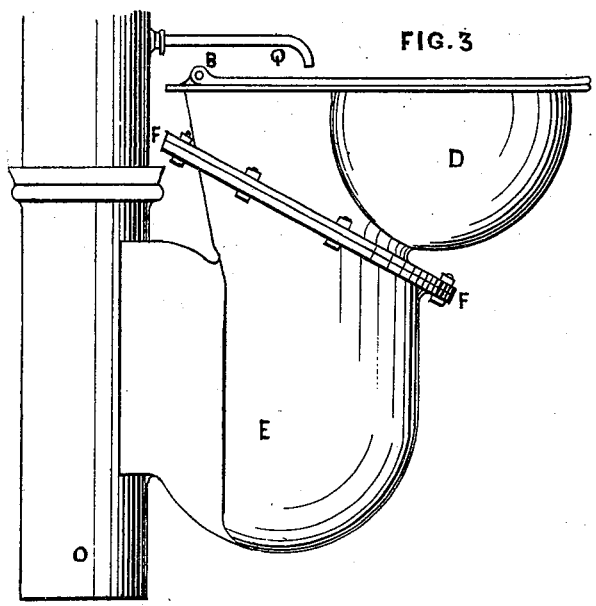
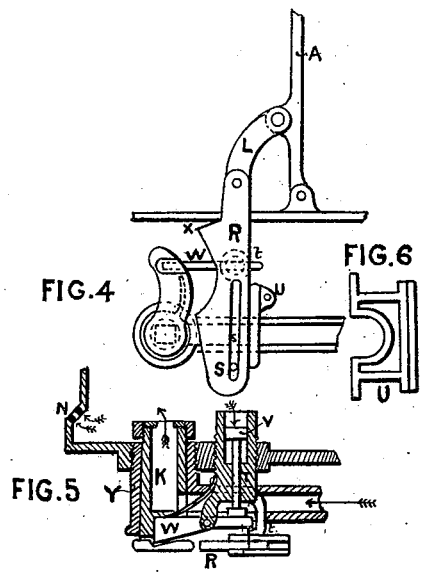
WITNESSES
Prescott J. Buckminster
William J. Chipchase
INVENTOR
Robert C. Ball
per his atty
Geo. Pardy

UNITED STATES PATENT OFFICE.

ROBERT C. BALL, OF OAKLAND, CALIFORNIA.

IMPROVEMENT IN WASH-STANDS AND WATER-CLOSETS COMBINED.

Specification forming part of Letters Patent No. 167,972, dated September 21, 1875; application filed June 8, 1875.

*To all whom it may concern:*

Be it known that I, ROBERT CURRY BALL, of Oakland, Alameda county, State of California, have invented an Improved Washstand and Water-Closet Combined, of which the following is a specification:

This invention is intended more particularly for use in prisons and hospitals, and is designed with a view of economizing space and obtaining convenient action, while maintaining such simplicity of parts as will render it effective, little liable to get out of order, and cheap to produce.

In the accompanying drawing my device is illustrated in Figure 1 by a sectional elevation, in Fig. 2 by a plan, in Fig. 3 by a side view, in Fig. 4 by a side view, of faucet and attachment separated from the remaining portions of the closet. Fig. 5 is a sectional plan of same, and Fig. 6 is a detached detail of a guide-piece more fully explained in this specification.

In the figures, where shown, A is the washbasin, which swings upon its hinge B. This basin is provided with a rubber ring, inserted in an annular groove cut underneath its rim, as shown in Fig. 1 at C C. The office of this rubber ring is both to form a cushion or spring-seat for the basin to fall on, and thus avoid noisy slamming of the basin upon its seat, and also to form a tight joint between the basin and closet-seat, which prevents any offensive odors escaping from the closet when the basin is shut down. D is the bowl of the closet, resting on and fastened to the stench-trap E at the joint F by bolts, as shown. G is the pan of the closet, which is operated to open and close the discharge from the bowl D by the rod H, which attaches to the washbasin. This rod H is pivoted to a little lug or projection on the wash-basin about an inch and a half forward of the hinge B, and in like manner the rod attaches to the pan by a pivot passing through a lug a little back of the hinge the pan swings on, so that as the washbasin swings up the pan swings down, and vice versa. The fan G is attached to the bowl of the closet by a hinge at I. At J the rod H must pass through the joint between the stench-trap E and the bowl of the closet D; therefore a hole is made through the flanges at this point, which is packed with rubber to prevent any odor escaping through the hole, which must be larger than the rod, because the rod vibrates when it is moved up and down. K is a cock or faucet, which is opened or closed by raising or dropping the wash-basin, and may be of any suitable construction, a link, L, connecting the handle or lever of the faucet with the wash-basin.

Below I will describe a faucet of my own design, which may be attached to the closet when it may be preferred.

M is a box or reservoir for accumulating water, so that when the basin is shut down, and the supply of water is shut off, there will remain a quantity of water to act in rinsing out the bowl D and fill the pan G as to form an auxiliary sealing between the bowl and stench-trap. The pipe part of the bowl is, as is usual, about an inch below the rim of the pan. There are small holes at N to admit the water from the reservoir M to the bowl of the closet.

The discharge pipe O is of common construction, and may connect with a number of closets.

The wash-basin is supplied from the waterpipe P by a swinging faucet, Q, such as is in common use, and it needs no particular description here.

In constructing my closet I have said I may use a faucet of any suitable design; but I have designed one of a special construction to be applied in cases where it is an object to economize water.

This faucet is shown in detail in Figs. 4, 5, and 6, and I will now describe it.

First, it must be understood this faucet is designed to supply the reservoir with one charge of water, and then to shut off the supply automatically, so that no waste will occur.

Referring to Figs. 4 and 5, M is the interior of the reservoir. A is the wash-basin hinged at B. D is the upper rim of the closet-bowl. P is the water-supply pipe, and N are the small holes leading from the reservoir into the closet-bowl. R is a flat lever, of the peculiar shape shown, which is attached to the washbasin by the link L. This lever R moves up and down with the wash-basin, and is held in place and guided as to move perpendicularly by the pin S moving in the slotted hole s, by the little projection t, on the cylinder T, and by the metal piece U, secured to the side of the reservoir, against the face of which the lever R slides. (So as not to confuse the drawing this piece is shown separately in Fig. 6.) V is a small piston working in the cylinder T, which cylinder is screwed into the side of the reservoir. The water in the reservoir presses against this piston when the reservoir is full. W is a swinging latch, which inserts one end into a notch in the lever of the faucet when this lever is brought to a perpendicular position. The latch has its fulcrum at w, and its projecting end beyond the fulcrum bears upon the piston-rod at v. A spring, x, operates to press this latch forward to engage with the lever of the faucet. The lever of the faucet is curved, as shown, and there is a curved recess in the lever R to allow the faucet-lever to drop. A spring, k, shown in broken lines, operates to throw down the lever of the faucet whenever it shall have obtained release from the latch. The plug of the faucet is tapered, and a nut is screwed on its end within the reservoir, which nut flanges over the end of the plug, and has a square hole, so that by inserting a square spike the nut may be screwed up and the plug brought to its proper bearing. The barrel of the faucet Y screws into the side of the bowl, a boss being provided for the purpose.

The operation of this faucet is as follows: The wash-basin being raised the lever R is raised with it, and the point of this lever X carries up the lever of the faucet until it reaches a perpendicular position, when the latch W swings into the notch on the faucet-lever, and holds it there, the faucet being now full open and discharging water into the reservoir. Now, as soon as the reservoir is filled a pressure will occur upon the piston V, and it will be pressed outward, the rod attached to it will bear on the opposite end of the latch, and will disengage it from the lever of the faucet. Now, the spring on the faucet-lever will throw it down and shut off the water-supply, and the reservoir emptying itself the piston will recede, having now no pressure upon it, and the latch is set again for the next operation.

Of course, during the time of filling the reservoir water is passing out of it through the small holes N; but these holes are made of just the proper size as to discharge less than the faucet, that enough pressure may be obtained to act upon the piston.

Instead of the spring k on the faucet-lever it may be better to use a weight to bring back the lever.

When the basin drops, and the lever R falls with it, this lever will come in contact with the faucet-lever, and owing to its curved shape it will press it upward, and open the faucet for a moment. This is an advantage, because there will be needed a small quantity of water to fill the pan.

What I claim as my invention, and desire to secure by Letters Patent, is as follows:

1. In combination with a water-closet, the wash-basin A, hinged at B, when said wash-basin operates to open the faucet K when raised its seat, substantially as and for the purpose described.

2. The rod H, connecting the pan G and wash-basin together, so as to operate to open and close the discharge by raising and lowering the wash-basin, substantially as described.

3. The faucet K, cylinder V, and piston T, latch W, and lever R, as in Figs. 4 and 5, operating together for the purpose and in the manner substantially as described.

ROBERT C. BALL.

Witnesses:
PRESCOTT S. BUCKMINSTER,
WILLIAM J. CHIPCHASE.